(12) United States Patent
Bujon et al.

(10) Patent No.: US 12,270,357 B2
(45) Date of Patent: Apr. 8, 2025

(54) METHOD AND SYSTEM FOR CONTROLLING A THRUST REVERSER OF AN AIRCRAFT

(71) Applicant: SAFRAN AIRCRAFT ENGINES, Paris (FR)

(72) Inventors: Irène Bujon, Moissy-Cramayel (FR); Jean-Loïc Hervé Lecordix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/798,795

(22) PCT Filed: Feb. 3, 2021

(86) PCT No.: PCT/FR2021/050197
§ 371 (c)(1),
(2) Date: Aug. 10, 2022

(87) PCT Pub. No.: WO2021/160953
PCT Pub. Date: Aug. 19, 2021

(65) Prior Publication Data
US 2023/0160356 A1 May 25, 2023

(30) Foreign Application Priority Data
Feb. 11, 2020 (FR) ........................ 2001326

(51) Int. Cl.
*F02K 1/76* (2006.01)
(52) U.S. Cl.
CPC ................ *F02K 1/76* (2013.01); *F02K 1/763* (2013.01); *F02K 1/766* (2013.01); *F05D 2270/09* (2013.01)

(58) Field of Classification Search
CPC .................................. F02K 1/766; F02K 1/76
See application file for complete search history.

(56) References Cited

U.S. PATENT DOCUMENTS 3,279,184 A 10/1966 Felix et al.
9,581,109 B1 * 2/2017 Pinto ....................... F02K 1/763
(Continued)

FOREIGN PATENT DOCUMENTS

WO WO 2015/155432 A1 10/2015

OTHER PUBLICATIONS

International Search Report as issued in International Patent Application No. PCT/FR2021/050197, dated Apr. 23, 2021.

*Primary Examiner* — Ted Kim
(74) *Attorney, Agent, or Firm* — Pillsbury Winthrop Shaw Pittman LLP

(57) ABSTRACT

A method for controlling a turbojet engine thrust reverser during an aborted aircraft takeoff, the thrust reverser including doors movable between a stowed position, an overstowed position and a deployed position; door actuators to move the doors between the stowed, overstowed and deployed positions; a device for locking the doors in the stowed position, moveable between a locking position and an unlocking position; and a lock actuator to move the locking device between the locking and unlocking positions. The method includes decreasing the engine speed of the turbojet engine by following a setpoint value below a first engine speed threshold value at which the aerodynamic forces being exerted on the doors are equal to the forces developed by the door actuators; controlling the door actuators to bring the doors into the overstowed position; controlling the lock actuator to bring the locking device into the unlocking position.

7 Claims, 3 Drawing Sheets

(56) References Cited

U.S. PATENT DOCUMENTS

2010/0264676 A1* 10/2010 Sternberger ............ F02K 1/766
  292/307 R
2015/0275821 A1   10/2015 Willett et al.
2017/0226963 A1    8/2017 Kopecek et al.
2018/0216573 A1*   8/2018 Kopecek ................. F02K 1/763

* cited by examiner

METHOD AND SYSTEM FOR CONTROLLING A THRUST REVERSER OF AN AIRCRAFT

CROSS-REFERENCE TO RELATED APPLICATIONS

This application is the U.S. National Stage of PCT/FR2021/050197, filed Feb. 3, 2021, which in turn claims priority to French patent application number 2001326 filed Feb. 11, 2020. The content of these applications are incorporated herein by reference in their entireties.

TECHNICAL FIELD OF THE INVENTION

The technical field of the invention is that of turbojet engine thrust reversers for aircraft. The invention more particularly relates to a method and a system for controlling a thrust reverser with doors during an aborted takeoff of the aircraft.

TECHNOLOGICAL BACKGROUND OF THE INVENTION

The role of a turbojet engine thrust reverser is to improve the braking capacity of an aircraft, during a landing or an aborted takeoff of the aircraft, by re-directing to the front of the turbojet engine at least a part of the gas flow generated by the combustion and/or a part of the cold air flow generated by a fan, in the case of a turbofan engine. The means making it possible to realise this flow redirection vary depending on the type of thrust reverser.

A door-type thrust reverser comprises at least two doors pivoting with respect to a nacelle housing the turbojet engine. These doors may be moved by means of cylinders between a stowed position, wherein they ensure the continuity of an aerodynamic flow path, and an open deployed position, wherein they obstruct this aerodynamic flow path and redirect the flow circulating therein.

The thrust reverser also comprises a locking system to maintain the doors in stowed position without loading the cylinders as long as a thrust reversal is not requested.

FIG. 1 represents a known exemplary locking system comprising an S shaped hook 10 arranged between the two doors (not represented) and rotationally mounted on a support 20 connected to the nacelle. A first end 10A of the S shaped hook 10 cooperates with a first locking hook 31A integral with one of the two doors and a second opposite end 10B of the S shaped hook 10 cooperates with a second locking hook 31B integral with the other door.

FIGS. 2A-2C represent the deployment sequence of a door thrust reverser provided with the locking system of FIG. 1. During a first phase represented by FIG. 2A, the cylinders are controlled in such a way as to bring the doors into an overstowed position, in order to create a play between the ends 10A-10B of the S shaped hook 10 and the locking hooks 31A-31B of the doors. Then, during a second phase illustrated by [FIG. 2B], the S shaped hook 10 is rotationally actuated to release the locking hooks 31A-31B from the ends 10A-10B. The cylinders may then be controlled, during a third phase illustrated by FIG. 2C, so as to open the doors. The locking hooks 31A-31B then move away from the S shaped hook 10.

The passage from the stowed position (FIG. 1) to the overstowed position (FIG. 2A) and the return to the stowed position, from which begins the actual opening of the doors ([FIG. 2C]), increases the duration of deployment of the thrust reverser and consequently delays it being brought into service. Yet, in the case of an aborted takeoff, it is important to deploy the thrust reverser as soon as possible to reduce the braking distance, because the aircraft is heavy due to the on-board fuel and has already covered a significant portion of the takeoff runway.

The deployment sequence of FIGS. 2A-2C is currently employed whatever the scenario of using the thrust reverser: landing or aborted takeoff. In other words, there does not exist an optimisation of the deployment sequence to make it more rapid in the event of an aborted takeoff.

SUMMARY OF THE INVENTION

The aim of the invention is to reduce the braking distance of an aircraft equipped with a thrust reverser with doors during an aborted takeoff of the aircraft.

According to a first aspect of the invention, one tends towards this objective by providing a method for controlling a turbojet engine thrust reverser, the thrust reverser comprising:

doors that can move between a stowed position wherein the doors ensure the continuity of an aerodynamic flow path, an overstowed position wherein the doors partially enter into the aerodynamic flow path and a deployed position wherein the doors divert at least a part of a flow passing through the aerodynamic flow path to generate a reverse thrust;
door actuators configured to move the doors between the stowed, overstowed and deployed positions;
a device for locking the doors in the stowed position, moveable between a locking position and an unlocking position;
a lock actuator configured to move the locking device between the locking and unlocking positions;

the method comprising the following steps:
decreasing the engine speed of the turbojet engine by following a setpoint value below a first engine speed threshold value at which the aerodynamic forces being exerted on the doors are equal to the forces developed by the door actuators;
controlling the door actuators so as to bring the doors into the overstowed position;
controlling the lock actuator so as to bring the locking device into the unlocking position; and
when the locking device is in the unlocking position, controlling the door actuators so as to bring the doors into the deployed position;

The control method according to the first aspect of the invention is remarkable in that the setpoint value of the engine speed is above the idle speed.

An engine speed setpoint value above the idle speed allows the turbojet engine to decelerate less low in order to carry out the overstowing of the doors and thus to produce a greater reverse thrust as soon as the deployment of the thrust reverser is finished. The braking distance in the event of aborted takeoff of the aircraft may thus be decreased.

In a preferential embodiment of the control method, the door actuators are advantageously controlled in such a way as to bring the doors into the overstowed position before the engine speed reaches the first engine speed threshold value. The deployment of the thrust reverser can thus begin and end sooner, which makes it possible to even further decrease the braking distance.

To shorten the deployment sequence of the thrust reverser, the door actuators and the lock actuator may be controlled simultaneously to bring respectively the doors into the overstowed position and the locking device into the unlocking position.

Apart from the characteristics that have been mentioned in the preceding paragraphs, the control method according to the first aspect of the invention may have one or more complementary characteristics among the following, considered individually or according to all technically possible combinations thereof:

the engine speed setpoint value is comprised between 70% and 95% of the first engine speed threshold value;
the door actuators are controlled in such a way as to bring the doors into the overstowed position as long as the locking device is not in the unlocking position;
the door actuators are controlled in such a way as to bring the doors into the deployed position as soon as the locking device passes into the unlocking position; and
the first engine speed threshold value corresponds to a minimum value of the forces developed by the door actuators and the door actuators are controlled in such a way as to bring the doors into the overstowed position at the latest when the engine speed reaches a second engine speed threshold value corresponding to maximum value of the forces developed by the door actuators.

A second aspect of the invention relates to a system for controlling a thrust reverser comprising means configured to implement a control method according to the first aspect of the invention.

In one embodiment, the control system comprises:
a directional control unit configured to supply with energy the door actuators and the lock actuator,
an isolation control unit configured to isolate the directional control unit from a power source;
a calculator configured to drive the directional control unit and the isolation control unit.

The invention and the different applications thereof will be better understood on reading the description that follows and by examining the figures that accompany it.

BRIEF DESCRIPTION OF THE FIGURES

Other characteristics and advantages of the invention will become clear from the description that is given thereof below, for indicative purposes and in no way limiting, with reference to the appended figures, among which.

For greater clarity, identical or similar elements are marked by identical reference signs in all of the figures.

DETAILED DESCRIPTION

Figure 3:
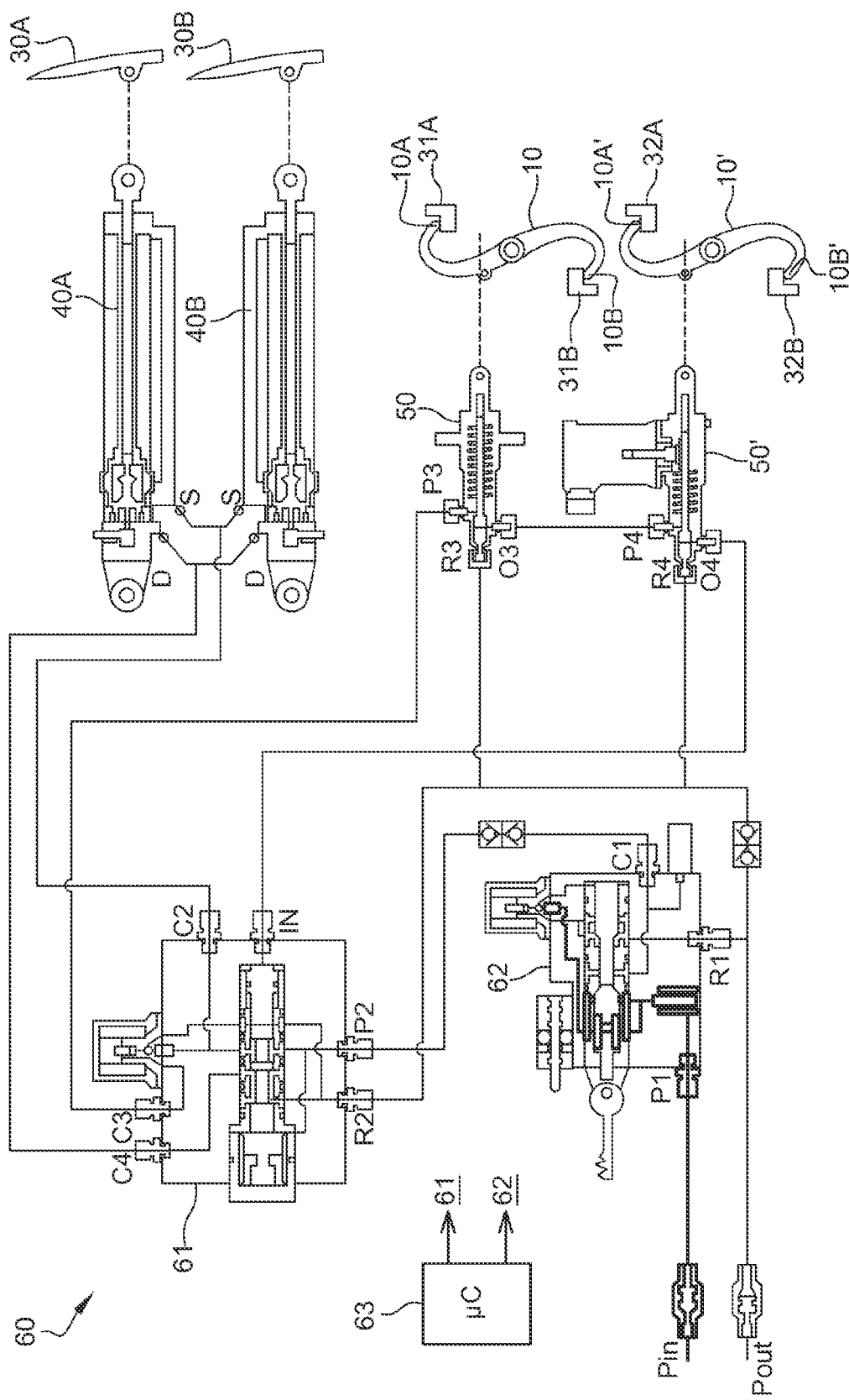
FIG. 3 is a schematic representation of a door thrust reverser of a turbojet engine and a hydraulic control system capable of implementing the control method according to the first aspect of the invention.

FIG. 3 schematically represents an exemplary turbojet engine thrust reverser for aircraft and an exemplary control system 60 by means of which the thrust reverser control method according to the invention will be described.

The thrust reverser is of the door-type and comprises:
a first door 30A and a second door 30B, that can move between a stowed position, an overstowed position and an open or deployed position;
a first door actuator 40A connected to the first door 30A and a second door actuator 40B connected to the second door 30B, making it possible to move the doors 30A-30B between the stowed, overstowed and deployed positions;
a first locking device 10 and a second locking device 10', that can move between a first so-called locking position of the doors 30A-30B in the stowed position and a second so-called unlocking position allowing the opening of the doors; and
a first lock actuator 50 connected to the first locking device 10 and a second lock actuator 50' connected to the second locking device 10', configured to move the locking devices 10-10' between the locking and unlocking positions.

The doors 30A-30B may be pivotably mounted with respect to a nacelle wherein is housed the turbojet engine. They are for example positioned in a diametrically opposite manner with respect to a longitudinal axis of the nacelle. In the stowed position, the doors 30A-30B ensure the continuity of an aerodynamic flow path delimited internally by the nacelle, typically the aerodynamic flow path of the secondary flow in the case of a turbofan engine. In the overstowed position, the doors 30A-30B partially enter into the aerodynamic flow path and the flow that circulates in the aerodynamic flow path while the turbojet engine is in operation exerts a pressure on the doors 30A-30B. In the deployed position, the doors 30A-30B obstruct the aerodynamic flow path and divert at least a part of the flow towards the upstream of the turbojet engine to generate a reverse thrust.

The doors 30A-30B of the thrust reverser are preferably moved simultaneously into the stowed position, the overstowed position or the deployed position by the door actuators 40A-40B.

The locking devices 10-10' are for example positioned between the doors 30A-30B in a diametrically opposite manner with respect to the longitudinal axis of the nacelle.

Figure 1:
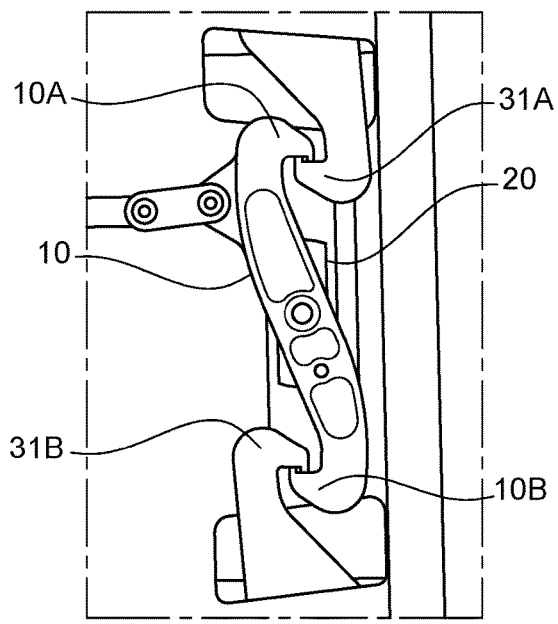
FIG. 1 represents a system for locking the doors of a turbojet engine thrust reverser according to the prior art.
Figure 2A:
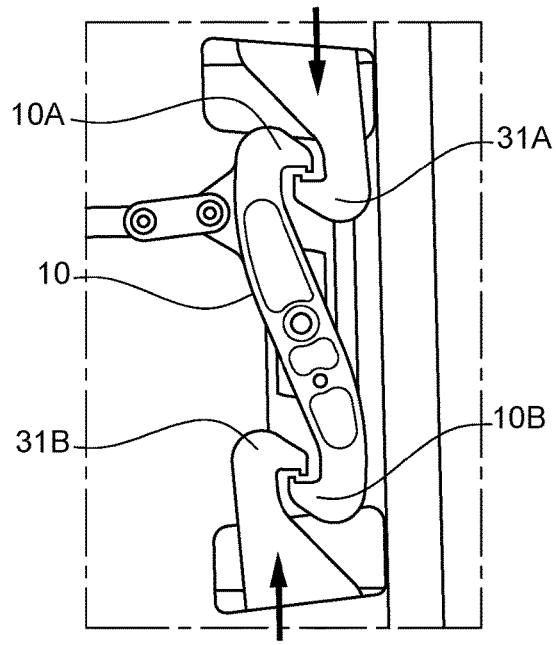
FIG. 2A, FIG. 2B and FIG. 2C represent different phases of a deployment sequence of a door thrust reverser provided with the locking system of FIG. 1.
Figure 2B:
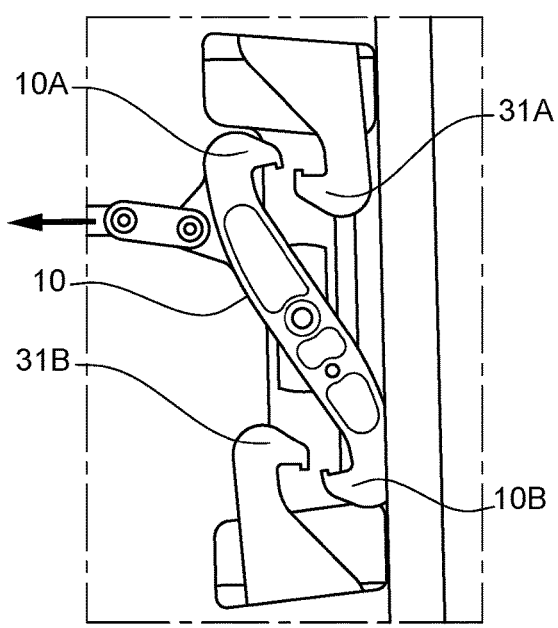
Figure 2C:
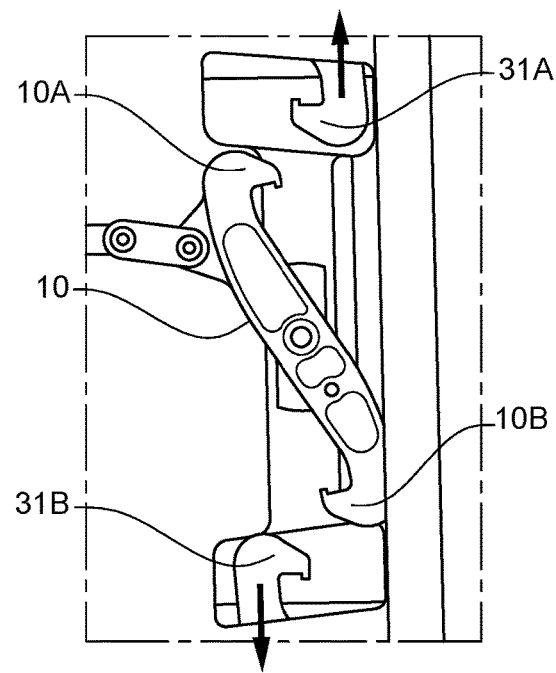

The locking devices 10-10' are preferably S shaped hooks, such as described previously in relation with FIG. 1. They may be pivotably mounted with respect to a support (such as support 20 of FIG. 1) fixed to the nacelle. The first S shaped hook 10 comprises a first end 10A able to cooperate with a first locking hook 31A of the first door 30A and a second opposite end 10B able to cooperate with a first locking hook 31B of the second door 30B. The second S shaped hook 10' comprises a first end 10A' able to cooperate with a second locking hook 32A of the first door 30A and a second opposite end 10B' able to cooperate with a second locking hook 32B of the second door 30B.

The thrust reverser control system 60 preferably comprises a directional control unit 61 hereafter called DCU, an isolation control unit 62 hereafter called ICU and a calculator 63.

In the example of FIG. 3, the control system 60 is a hydraulic control system, because the door actuators 40A-40B are constituted of hydraulic cylinders, the first lock actuator 50 is a hydraulic primary lock, hereafter called "HPL" and the second lock actuator 50' is an electro-hydraulic primary lock, hereafter called "EHPL".

The DCU 61 is a solenoid valve (designated directional control valve) comprising several inputs and several outputs for a fluid. It is connected to the hydraulic cylinders 40A-40B by a first loop of a hydraulic circuit (wherein circulates the fluid) and to the primary (electro) hydraulic locks 50-50' by a second loop of the hydraulic circuit. The HPL 50 and the EHPL 50' are advantageously connected (hydraulically) in series with the DCU 61.

The DCU 61 has the role of supplying with energy the different actuators of the thrust reverser, here by directing the fluid to one or the other of the inputs-outputs D/S of the hydraulic cylinders 40A-40B and/or to the input P3 of the HPL 50 (of which the output O3 is advantageously connected to the input P4 of the EHPL 50').

The ICU 62 is situated between the main input Pin of the hydraulic circuit and the DCU 61. It is charged with isolating the DCU 61, the cylinders 40A-40B and the locks 50-50' from the hydraulic power supply in the absence of deployment command, in order to avoid an untimely deployment of the thrust reverser in flight.

The DCU 61 and the ICU 62 are driven by the calculator 63 so as to deploy the thrust reverser. The calculator 63 may be distinct from or form part of the full-authority digital electronic control (FADEC) of the aircraft.

The control system 60 may require the deployment of the thrust reverser according to the following sequence.

During a first so-called door overstowed phase, the calculator 63 activates the ICU 62 so that it hydraulically supplies the DCU 61. The DCU 61 is maintained in a passive state, also called "OFF" state. In this state, the hydraulic power is directed to the cylinders 40A-40B so as to overstow the doors 30A-30B (cf. FIG. 1). The locks 50-50' are not supplied by the DCU 61 and maintain the S shaped hooks 10-10' in the locking position.

After having respected a delay period corresponding to the maximum duration of overstowing the doors 30A-30B, the calculator 63 triggers a second so-called door unlocking phase. It activates the DCU 61 to direct a part of the hydraulic power to the HPL 50 in order that it moves the first S shaped hook 10 into the unlocking position. As soon as the HPL 50 manages to move the first S shaped hook 10, the hydraulic power passes from the HPL 50 to the EHPL 50'. The EHPL 50' then moves the second S shaped hook 10' into the unlocking position. During this door unlocking phase, the cylinders 40A-40B are still controlled in such a way as to overstow the doors (thus creating play between the S shaped hooks 10-10' and the corresponding locking hooks 31A-31B, 32A-32B of the doors 30A-30B).

As soon as the EHPL 50' manages to move the second S shaped hook 10' into the unlocking position, the hydraulic power traverses the EHPL 50' and returns to the DCU 61. This has the effect of triggering a third phase of the sequence, that of the opening of the doors 30A-30B. Indeed, the return of the hydraulic power (via the IN input of the DCU 61) leads to the switching of the DCU 61 into a position where the cylinders 40A-40B are powered so as to open the doors 30A-30B.

Thus, in the control system of FIG. 3, the cylinders 40A-40B continue to act in the sense of overstowing of the doors 30A-30B as long as the S shaped hooks 10-10' are not in the unlocking position and the control of the cylinders 40A-40B to bring the doors 30A-30B into the deployed position is immediately consecutive to the unlocking of the doors.

The cylinders 40A-40B may not manage to overstow the doors 30A-30B if the flow that circulates in the aerodynamic flow path exerts on the doors aerodynamic forces greater than the forces developed by the cylinders. The aerodynamic forces that are exerted on the doors 30A-30B depend on the speed of the engine generating the flow, for example the low pressure engine speed N1 (also called fan engine speed) in the case of a thrust reverser diverting the secondary flow of a turbofan engine. Thus, in order that the doors 30A-30B can be brought into the overstowed position, the engine speed N1 must be less than a threshold value, hereafter called "$N1_{OTD}$", at which the aerodynamic forces being exerted on the doors 30A-30B are equal to the forces developed by the cylinders 40A-40B.

Yet in a situation of aborted takeoff of the aircraft, the engine speed is well above the threshold value $N1_{OTD}$ when the pilot requires the deployment of the thrust reverser. To bring the doors into the overstowed position, it is thus necessary beforehand to decrease the engine speed below the threshold value $N1_{OTD}$.

Figure 4:
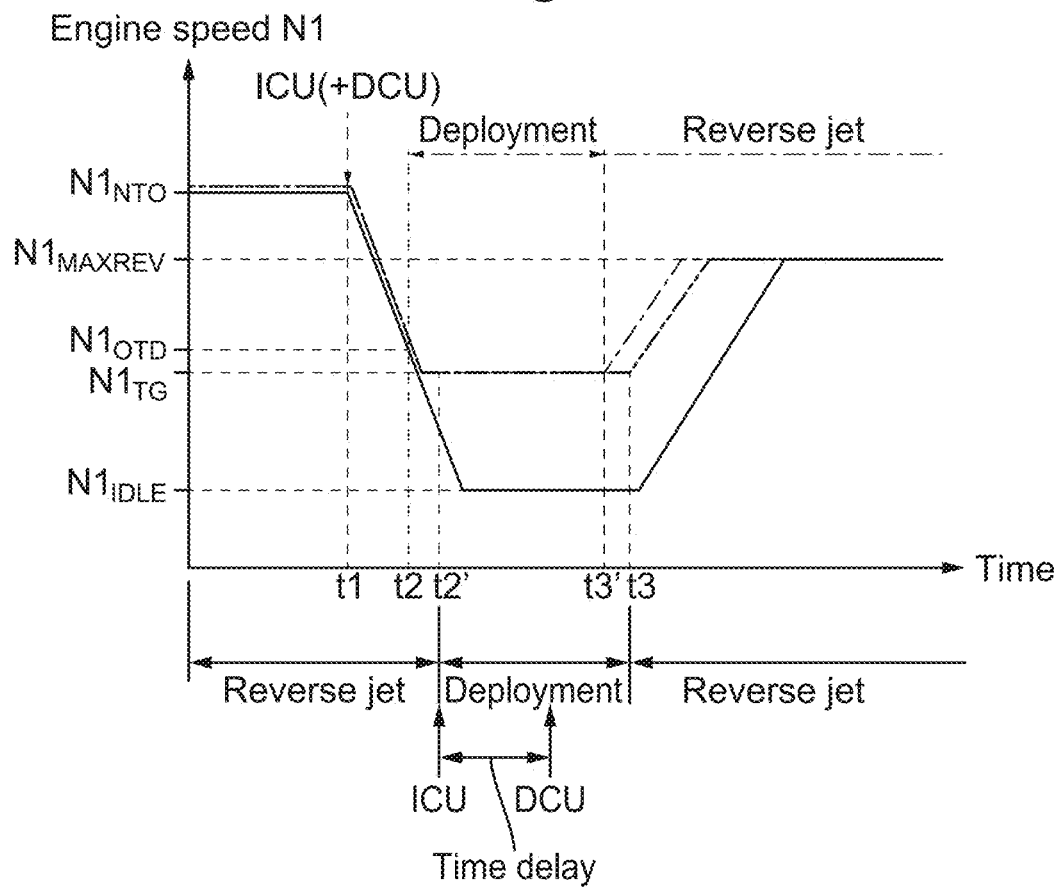
FIG. 4 represents the engine speed of the turbojet engine when the thrust reverser is controlled in a conventional manner and when the control method according to the first aspect of the invention is applied.

FIG. 4 represents by a solid line curve the engine speed when the sequence described above is applied in a situation of aborted takeoff of the aircraft.

At the moment $t_1$ where the pilot of the aircraft requires the deployment of the thrust reverser (by passing the throttle lever from the "takeoff" position to the "thrust reverser" position), the engine operates in direct jet and the engine speed N1 is maximal to allow the aircraft ($N1=N1_{NTO}$) to take off. A decrease of the engine speed N1 is controlled, with for setpoint value the idle speed $N1_{IDLE}$. The engine speed N1 becomes equal to the threshold value $N1_{OTD}$, at the moment $t_2$. However, the deployment sequence only begins (that is to say the ICU 62 is only activated) after having detected that the engine speed N1 is below the threshold value $N1_{OTD}$, at the moment $t_2'$. During a part of the deployment, the engine speed N1 continues to decrease until reaching the setpoint value, here the idle speed $N1_{IDLE}$. Then, when the deployment of the thrust reverser is terminated (that is to say when the doors 30A-30 are in the deployed position) at the moment ta, the engine operates in reverse jet and the engine speed N1 is progressively increased up to a maximum reverse thrust value $N1_{MAXREV}$.

It may be observed that with such a management of the engine speed, the maximum reverse thrust is only available belatedly, because the engine decelerates down to a minimum speed ($N1_{IDLE}$) and takes a lot of time to re-accelerate.

Within the scope of the invention, a method for controlling a thrust reverser is proposed wherein the reverse thrust produced as of the end of the deployment is greater and wherein the unavailability duration of the maximum reverse thrust is reduced. This control method comprises a particular management of the engine speed N1, illustrated by the mixed line curve in FIG. 4.

In the control method according to the invention, the engine speed N1 is decreased by following a setpoint value $N1_{TG}$ below the threshold value $N1_{OTD}$ but above the idle speed $N1_{IDLE}$. Thus, the engine decelerates less low and the re-acceleration phase last less long. Further, the engine speed N1 is higher when the deployment of the thrust reverser is terminated (moment $t_3$).

The engine speed setpoint value $N1_{TG}$ is preferably comprised between 70% and 95% of the threshold value $N1_{OTD}$ at which the aerodynamic forces being exerted on the doors 30A-30B are equal to the forces developed by the cylinders 40A-40B.

In a preferential embodiment of the control method also represented by FIG. 4, the order of deployment of the thrust reverser is given earlier, before the engine speed reaches the threshold value $N1_{OTD}$, for example at the moment $t_1$ where the pilot requires the deployment of the thrust reverser ($N1=N1_{NTO}$). In other words, the cylinders 40A-40B are controlled in such a way as to bring the doors 30A-30B into the overstowed position (by activating the ICU 61 in the control system 60 of FIG. 3) before the engine speed N1 reaches the threshold value $N1_{OTD}$. This chronology makes it possible to begin the deployment sooner, at the moment $t_2$ instead of at the moment $t_2'$, and makes optional the comparison of the engine speed with the threshold value $N1_{OTD}$. Consequently, the deployment also terminates sooner, at the moment $t_3'$ ($t_3'<t_3$) in FIG. 4, and the reverse thrust is available sooner.

Thus, the cylinders 40A-40B will try to accomplish the overstowing of the doors but will only manage this when the engine speed will have dropped sufficiently. This "overload" of the cylinders for a brief moment (of the order of 0.1 s to 1 s) is not conductive to causing breakdowns of the thrust reverser or to accelerate its ageing.

Advantageously, the cylinders 40A-40B are controlled to bring the doors into the overstowed position at the same time as the HPL 50 is controlled to bring the first S shaped hook 10 into the unlocking position. This may be done with the control system of FIG. 3 by simultaneously activating the ICU 62 and the DCU 61.

In other words, the delay between the start of the phase of overstowing the doors and the start of the phase of unlocking the doors is eliminated. The HPL 50 tries to pull on the first S shaped hook 10 until the cylinders 40A-40B manage to overstow the doors, that is to say until the engine speed is sufficiently low to overcome the aerodynamic forces. The unlocking of the doors is thus immediately consecutive to the overstowing of the doors.

Such a control mode is beneficial when the doors are overstowed in a time lapse shorter than that expected, for example because the hydraulic power available is greater than expected. It may cause wear of the S shaped hooks 10-10' and the unlocking hooks 31A-31B, 32A-32B, because they force them onto one another. However, since situations of aborted takeoff of an aircraft are exceptional (around once every 10,000 takeoffs), this wear of the hooks remains very limited. It is consequently acceptable.

The pressure in the hydraulic circuit may vary in an important manner from one use to the other of the thrust reverser, notably as a function of the manufacturing and wear dispersion or the conditions of use of the system (temperature, external pressure). The cylinders 40A-40B thus do not always have available the same hydraulic power to carry out the overstowing of the doors 30A-30B.

Figure 5:
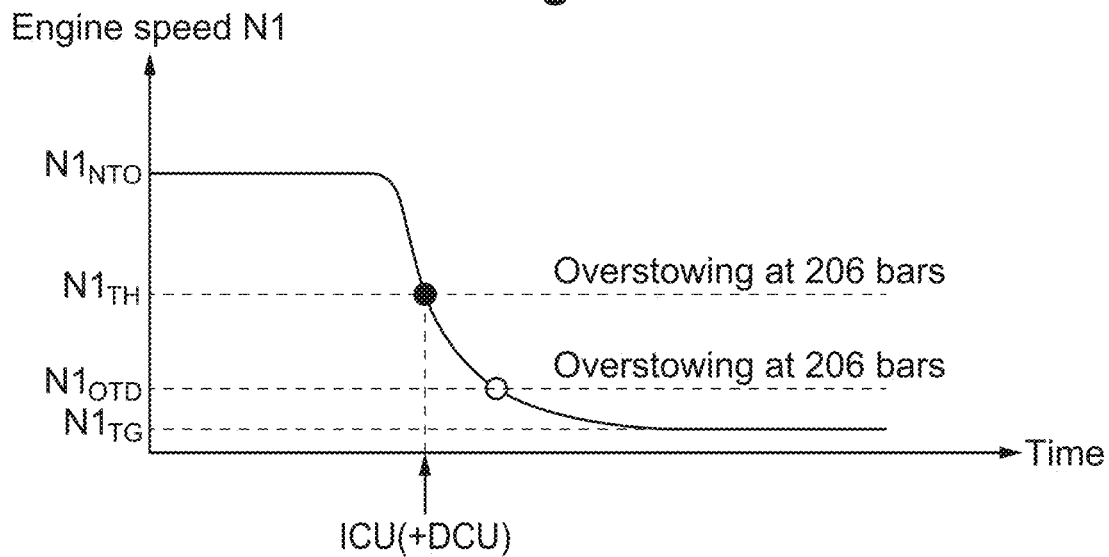
FIG. 5 represents two engine speed threshold values from which the deployment sequence of the thrust reverser begins, depending on the power available to actuate the doors.

FIG. 5 illustrates an advantageous manner of managing the engine speed N1 in such a situation. The engine speed threshold value $N1_{OTD}$ is chosen so as to correspond to a minimum value of the forces developed by the cylinders, in other words to the minimum hydraulic pressure. For example, if the hydraulic pressure varies between 185 bars and 206 bars, the engine speed N1 is decreased by following a setpoint value $N1_{TG}$ below a first threshold engine speed value ($N1_{OTD}$) corresponding to an overstowing of the doors at 185 bars. Conversely, the cylinders 40A-40B are advantageously controlled to overstow the doors 30A-30B at the latest when the engine speed N1 reaches a second threshold value $N1_{TH}$ corresponding to a maximum value of the forces developed by the cylinders, i.e. in this example to an overstowing of the doors at 206 bars. Thus, the deployment sequence will be able to start (by the phase of overstowing of the doors) before the engine speed N1 reaches the first threshold value $N1_{OTD}$ if the available pressure is finally above 185 bars.

The thrust reverser may alternatively comprise a hydraulic pressure sensor to know precisely the force that the cylinders 40A-40B can develop at the moment of an aborted takeoff. The setpoint value $N1_{TG}$ is then determined (by the calculator 63) as a function of the engine speed threshold value $N1_{OTD}$ corresponding to this force.

The control method according to the invention is implemented when an aborted takeoff is detected. The detection of an aborted takeoff may be performed by the calculator 63 of the control system 60, on the basis of information coming from the cockpit and/or from the engine. For example, an aborted takeoff is detected when the following conditions are met:
 the aircraft is on the ground since several minutes;
 the throttle lever is in the "maximum reverse thrust" position; and
 the throttle lever was in the "takeoff" position less than one minute ago.

The control method according to the invention has been described above in taking as example a thrust reverser comprising hydraulic cylinders and (electro) hydraulic primary locks. It may however be implemented with any type of actuator, notably pneumatic or electric actuators. The locking devices are not necessarily two in number and may adopt shapes other than an S shaped hook. Generally speaking, the control method according to the invention is applicable to any turbojet engine thrust reverser comprising at least two doors, at least two door actuators, at least one device for locking the doors in the stowed position and at least one lock actuator associated with the locking device.

In the same way, the hydraulic circuit, the DCU 61 and the ICU 62 of the control system 60 represented by FIG. 3 may be replaced by any other means (notably electronic) configured for controlling the door actuators in the overstowed or deployed position and for controlling the lock actuator in the unlocking position.

The invention claimed is:

1. A method for controlling a turbojet engine thrust reverser during an aborted aircraft takeoff, the thrust reverser comprising:
 doors that are movable between a stowed position wherein the doors ensure continuity of an aerodynamic flow path, an overstowed position wherein the doors partially enter into the aerodynamic flow path and a deployed position wherein the doors divert at least a part of a flow passing through the aerodynamic flow path to generate a reverse thrust;
 door actuators configured to move the doors between the stowed, overstowed and deployed positions;
 a locking device for locking the doors in the stowed position, moveable between a locking position and an unlocking position;
 a lock actuator configured to move the locking device between the locking and unlocking positions;
wherein, during said aborted aircraft takeoff, the method comprises:
 decreasing an engine speed of the turbojet engine by following a setpoint value below a first engine speed threshold value, wherein, at said first engine speed threshold value, the aerodynamic forces being exerted on the doors are equal to forces developed by the door actuators, and wherein, during said aborted aircraft takeoff, the setpoint value of the engine speed is above the idle speed;

controlling, during said aborted aircraft takeoff, the door actuators so as to bring the doors into the overstowed position before the engine speed reaches the first engine speed threshold value;

controlling the lock actuator so as to bring the locking device into the unlocking position; and when the locking device is in the unlocking position, controlling the door actuators so as to bring the doors into the deployed position.

2. The method according to claim 1, wherein the engine speed setpoint value is comprised between 70% and 95% of the first engine speed threshold value.

3. The method according to claim 1, wherein the door actuators and the lock actuator are controlled simultaneously to bring respectively the doors into the overstowed position and the locking device into the unlocking position.

4. The method according to claim 1, wherein the door actuators are controlled so as to bring the doors into the overstowed position as long as the locking device is not in the unlocking position.

5. The method according to claim 1, wherein the door actuators are controlled so as to bring the doors into the deployed position as soon as the locking device passes into the unlocking position.

6. The method according to claim 1, wherein the first engine speed threshold value corresponds to a minimum value of the forces developed by the door actuators and wherein the door actuators are controlled so as to bring the doors into the overstowed position at the latest when the engine speed reaches a second engine speed threshold value corresponding to a maximum value of the forces developed by the door actuators.

7. A control system for controlling a turbojet engine thrust reverser, the thrust reverser comprising:

doors that are movable between a stowed position wherein the doors ensure the continuity of an aerodynamic flow path, an overstowed position wherein the doors partially enter into the aerodynamic flow path and a deployed position wherein the doors divert at least a part of a flow passing through the aerodynamic flow path to generate a reverse thrust;

door actuators configured to move the doors between the stowed, overstowed and deployed positions;

a device for locking the doors in the stowed position, moveable between a locking position and an unlocking position;

a lock actuator configured to move the locking device between the locking and unlocking positions;

the control system configured to implement a control method for controlling the turbojet engine thrust reverser during an aborted aircraft takeoff, wherein the control system comprises a directional control unit configured to supply with energy the door actuators and the lock actuator;

an isolation control unit configured to isolate the directional control unit from a power source, and a calculator, wherein, during said aborted aircraft takeoff, an engine speed of the turbojet engine is decreased by following a setpoint value below a first engine speed threshold value, wherein, during said aborted aircraft takeoff, the setpoint value of the engine speed is above the idle speed and wherein, at said first engine speed threshold value, the aerodynamic forces being exerted on the doors are equal to forces developed by the door actuators, wherein, during said aborted aircraft takeoff, the calculator drives the directional control unit and the isolation control unit in order to:

control, during said aborted aircraft takeoff, the door actuators so as to bring the doors into the overstowed position before the engine speed reaches the first engine speed threshold value, control the door actuators so as to bring the locking device into the unlocking position, and when the locking device is in the unlocking position, control the door actuators so as to bring the doors into the deployed position.

* * * * *